United States Patent
Edwards

(10) Patent No.: US 10,161,166 B2
(45) Date of Patent: Dec. 25, 2018

(54) HANDLE CHASSIS WITH SNAP LOCK DATUM LOCATOR FOR VEHICLE DOOR ASSEMBLY

(71) Applicant: GM GLOBAL TECHNOLOGY OPERATIONS LLC, Detroit, MI (US)

(72) Inventor: Robert J. Edwards, Lapeer, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 372 days.

(21) Appl. No.: 15/208,789

(22) Filed: Jul. 13, 2016

(65) Prior Publication Data

US 2018/0016819 A1  Jan. 18, 2018

(51) Int. Cl.
E05B 79/06  (2014.01)
B60J 5/04  (2006.01)
E05B 85/14  (2014.01)

(52) U.S. Cl.
CPC ............ *E05B 79/06* (2013.01); *B60J 5/0416* (2013.01); *B60J 5/0463* (2013.01); *E05B 85/14* (2013.01)

(58) Field of Classification Search
CPC ...................................... E05B 79/06
USPC ....................................... 296/146.1
See application file for complete search history.

(56) References Cited

U.S. PATENT DOCUMENTS

| | | | |
|---|---|---|---|
| 6,523,871 B1 * | 2/2003 | Josserand | E05B 79/06 292/347 |
| 6,880,870 B2 | 4/2005 | Costigan | |
| 7,665,776 B2 | 2/2010 | Lang | |
| 8,128,137 B2 | 3/2012 | Takaya et al. | |
| 8,376,424 B2 * | 2/2013 | Bejune | E05B 77/04 292/336.3 |
| 8,469,411 B2 | 6/2013 | Costigan | |
| 8,966,826 B2 * | 3/2015 | Kudoh | E05B 79/06 292/336.3 |
| 9,062,477 B2 | 6/2015 | Da Deppo et al. | |
| 2002/0059698 A1 * | 5/2002 | Josserand | E05B 79/06 16/444 |

\* cited by examiner

*Primary Examiner* — Dennis H Pedder
(74) *Attorney, Agent, or Firm* — Quinn IP Law

(57) ABSTRACT

Vehicle door handle chassis, motorized vehicles with door handle chassis, and methods of constructing and methods of using handle chassis are disclosed. Presented herein, for example, is a handle chassis for a motor vehicle door assembly. The door assembly includes a door handle and a support structure with a chassis aperture and at least one ramped tab. The handle chassis includes a rigid chassis body with a handle aperture that receives therein a portion of the door handle such that the door handle secures to the chassis body. One or more flexible hooks project from the chassis body. Each flexible hook is configured to insert into a receiving end of the chassis aperture, flex in a first direction while moving over a respective ramped tab towards a securing end, and thereafter flex in a second direction into a respective securing slot to thereby fasten the chassis to the support structure.

20 Claims, 3 Drawing Sheets

HANDLE CHASSIS WITH SNAP LOCK DATUM LOCATOR FOR VEHICLE DOOR ASSEMBLY

TECHNICAL FIELD

The present disclosure relates generally to door assemblies for motor vehicles. More specifically, aspects of this disclosure relate to exterior door handle mechanisms for manually operating a motor vehicle door assembly.

BACKGROUND

Current production motor vehicles, such as the modern-day automobile, are originally equipped with driver-side and passenger-side vehicle door assemblies that are movably mounted to the vehicle body to provide access for entering and exiting the vehicle. Many conventional vehicle door assemblies are designed with an armrest that extends from the interior of the door assembly into the passenger compartment. The armrest is intended, in part, to provide a surface on which an occupant seated adjacent the door may rest the lower extremities of his or her arm. Typically, part of a decorative trim arrangement defining the inner surface of the door assembly, the armrest is often integrated with a door latch release lever and a pull-handle or pull-cup used to open and close the door assembly. The majority of conventional armrest assemblies are self-contained units that are positively attached to the door's inner panel or other structural components of the vehicle by, for example, screws, bolts, push pins, or heat stakes.

A vehicle door handle is also provided along an outer door panel and employed to pull the vehicle door assembly from a closed position to an open position so that the occupant can enter the vehicle, and vice-versa after the occupant alights from the vehicle. The exterior door handle typically functions in cooperation with, or operates as, a door latch release lever to selectively disengage the door latch such that the vehicle door assembly, in turn, can be moved to an open position. A conventional exterior door handle includes a handle portion that is pivotable relative to a bracket or chassis that is mounted to the outer door panel. Pivotal movement of the handle portion applies tension to a cable that moves a latch mechanism to release the latch and open the door. Locking mechanisms can also be provided to prevent the various vehicle door assemblies from unwantedly opening.

SUMMARY

Disclosed herein are handle chassis for vehicle door assemblies, methods for making and for using a vehicle door handle chassis, and motor vehicles with a door handle chassis. By way of non-limiting example, an improved door handle chassis is disclosed that includes a six-way positioning snap lock datum locator which couples the handle chassis to the door's support structure, such as the outer door panel. In at least some configurations, the snap lock datum locator comprises a pair of laterally spaced flexible hooks that are inserted into a receiving (wide) end of an aperture in the outer door panel. The chassis then translates rectilinearly to move the hooks from the receiving end towards a securing (narrow) end of the outer door panel's aperture. In so doing, the hooks slide against inwardly projecting ramped tabs of the outer door panel; these tabs urge the hooks towards each other. Once moved over and past the ramped tabs, the hooks elastically bias back towards their original positions to seat inside respective securing slots proximal the securing end of the door panel's aperture. Opposing shoulders of each securing slot interface with opposing sides of each hook to prevent additional translation or rotation thereof. A threaded fastener can then be applied to rigidly lock the vehicle handle chassis to the outer door panel.

For at least some embodiments, the chassis' snap lock design provides for multi-axis datum positioning and secure mechanical engagement that help to ensure accurate, time-saving, and efficient installation of the door handle assembly. The handle chassis design can also help to ensure ease of operation of the door handle's interfacing moving components and also allows for simplified removal during servicing. Another advantage can include elimination of a dedicated hand tool that is required to install prior poke yoke (also spelled "poka-yoke") chassis attachment designs.

Aspects of the present disclosure are directed to handle chassis for vehicle door handles. For example, a handle chassis for a door assembly of a motor vehicle is disclosed. The door assembly includes a door handle and a support structure, such as an outer door panel, with a chassis aperture and at least one ramped tab. The chassis aperture has receiving and securing ends with at least one securing slot proximal the securing end. The handle chassis includes a rigid chassis body with a handle aperture configured to receive therein a portion of the door handle such that the door handle secures to the chassis body. At least one flexible hook projects from the chassis body. The at least one flexible hook is configured to insert into the receiving end of the chassis aperture, flex in a first direction while moving over the at least one ramped tab towards the securing end, and thereafter flex in a second direction into the at least one securing slot to thereby fasten the chassis body to the support structure.

Other aspects of the present disclosure are directed to motor vehicles with vehicle door assemblies. A "motor vehicle," as used herein, may include any relevant vehicle platform, such as passenger vehicles (internal combustion engine (ICE), hybrid, electric, etc.), industrial vehicles, buses, all-terrain vehicles (ATV), motorcycles, farm equipment, boats, airplanes, etc. In one example, a motor vehicle includes a vehicle body with a door frame, and a door assembly with a door support panel mounted to the door frame. The door panel includes first and second laterally spaced ramped tabs that protrude into an elongated chassis aperture. This chassis aperture has longitudinally spaced receiving and securing ends. First and second laterally spaced securing slots are located adjacent the first and second ramped tabs, respectively, e.g., in between the longitudinal ends of the aperture.

The door assembly also includes a handle chassis with a rigid chassis body, which defines therethrough a handle aperture. A portion of a door handle passes through the chassis aperture in the door panel, into the handle aperture in the handle chassis, and secures to a pivot arm interface on an inside surface of the chassis. The handle chassis includes first and second substantially parallel flexible hooks that project into the handle aperture. These flexible hooks are configured to insert into the receiving end of the chassis aperture, move towards the securing end, flex towards each other while sliding against the first and second ramped tabs, respectively, and thereafter flex away from each other into the first and second securing slots, respectively, to thereby couple the chassis body to the door panel.

According to other aspects of the present disclosure, methods of making and methods of using vehicle door handle chassis are presented. For instance, a method of constructing a handle chassis for a motor vehicle door assembly is disclosed. The door assembly includes a door handle and a support structure with a chassis aperture and at least one ramped tab. The chassis aperture has receiving and securing ends with at least one securing slot proximal the securing end. The method includes: forming a rigid chassis body with a handle aperture configured to receive therein a portion of a door handle such that the door handle secures to the chassis body; and forming at least one flexible hook to project from the chassis body, the at least one flexible hook being configured to insert into the receiving end of the chassis aperture, flex in a first direction while moving over the at least one ramped tab towards the securing end, and thereafter flex in a second direction into the at least one securing slot to thereby couple the chassis body to the support structure.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
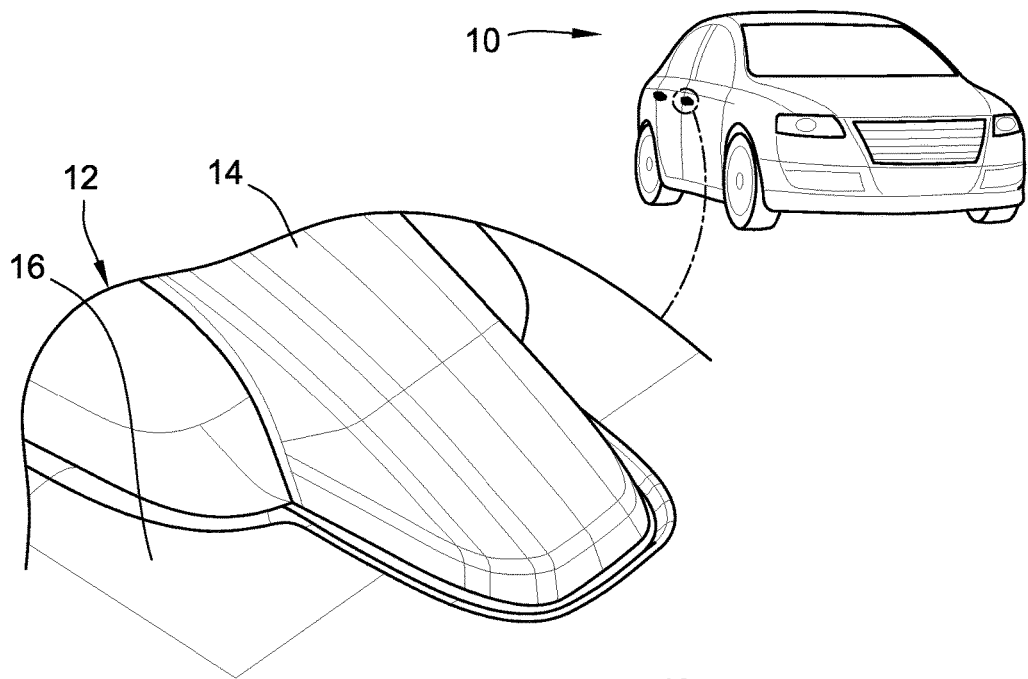
FIG. 1 is a perspective-view illustration of a representative vehicle door assembly of a motorized vehicle with a door handle mechanism in accordance with aspects of the present disclosure.

The present disclosure is susceptible to various modifications and alternative forms, and some representative embodiments have been shown by way of example in the drawings and will be described in detail herein. It should be understood, however, that the inventive aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE
ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a perspective-view illustration of a representative automobile, designated generally at 10, with an arrangement of vehicle doors, which are collectively represented in the drawings by a passenger-side vehicle door assembly 12. Mounted at a lateral portion of the automobile 10, e.g., to a door frame defined, in part, by juxtaposed support pillars of the vehicle body, the vehicle door assembly 12 is provided with an exterior door handle 14 that is movably mounted to an outer door panel 16. The automobile 10—also referred to herein as "motor vehicle" or "vehicle" for short—is merely an exemplary application with which the inventive aspects of this disclosure can be practiced. In the same vein, the implementation of the present concepts into an exterior door handle mounted to an outer door panel should also be appreciated as an exemplary application of the inventive concepts disclosed herein. As such, it should be understood that the aspects and features of the present disclosure can be integrated into other handle assemblies and utilized for any type of motor vehicle. Lastly, the drawings presented herein, are not necessarily to scale and are provided purely for instructional purposes. Thus, the specific and relative dimensions shown in the drawings are not to be construed as limiting.

Vehicle door assembly 12 of FIG. 1 can be pivotably mounted, e.g., via a multi-stage check-spring door hinge, to the vehicle body's door frame to provide access to and securely close a portion of the passenger compartment. The door assembly 12 has a door latch system (not shown) for securing the door assembly 12 to the door frame in a closed position. By way of example, the exterior door handle 14 is pulled, pivoted or otherwise moved, e.g., away from the door panel 16, to apply a tensile force to an internal cable of the door latch system and thereby activate a spring-biased latch. This allows the door assembly 12 to be moved to an open position. Upon release of the door handle 14, the internal cable, which may be of the Bowden cable type, will be biased back to its original position by the spring-biased latch such that the latch mechanism can reengage a complementary latch plate on the door frame when the vehicle door assembly 12 is moved back to the closed position. An optional locking mechanism (not visible in the drawings) may be provided to prevent unwanted activation of the door latch system.

Figure 2:
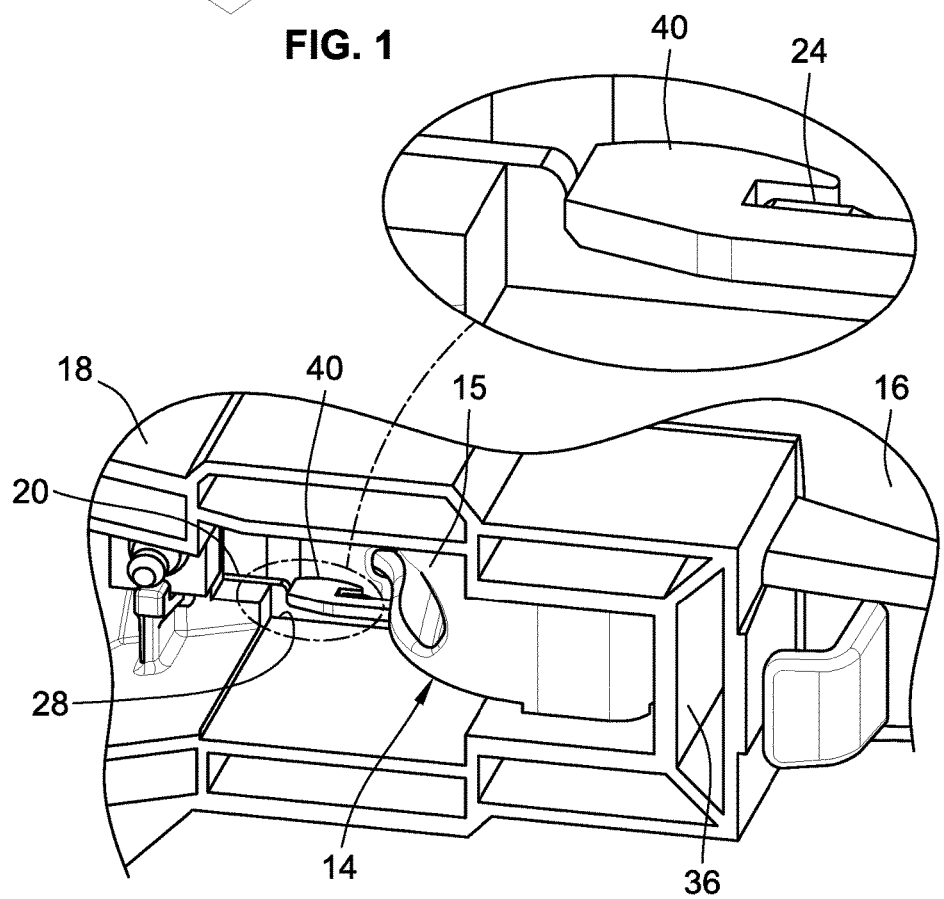
FIG. 2 is an inside perspective-view illustration of a section of the vehicle door assembly of FIG. 1 showing a portion of a representative handle chassis in accordance with aspects of the present disclosure.
Figure 5:
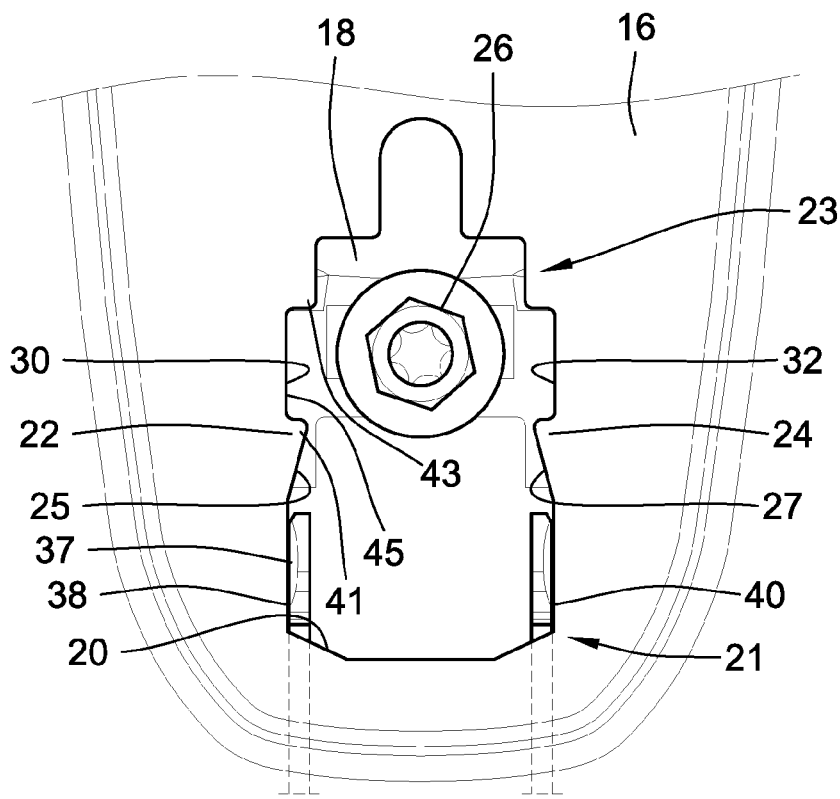
FIG. 5 is a plan-view illustration of the door panel and handle chassis showing the flexible hooks of the handle chassis inserted into a receiving end of a chassis aperture in the door panel.
Figure 6:
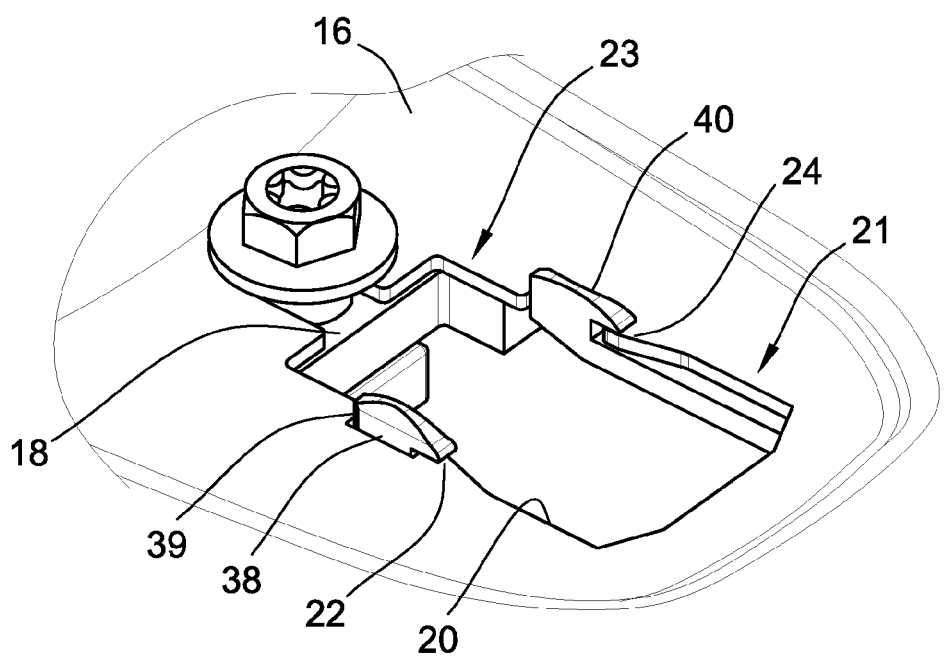
FIG. 6 a perspective view illustration of the door panel and handle chassis of FIG. 5 showing each of the flexible hooks of the handle chassis seated within respective securing slots of the door panel.

Referring next to FIG. 2, there is shown mounted along an inside surface of the door panel 16 a handle chassis 18 that provides subjacent support for operation of the door handle 14. The handle chassis 18, which may be fabricated from a molded plastic, is positioned to align a handle aperture 28 of the chassis 18 over an elongated chassis aperture 20 that extends through the door panel 16. The chassis aperture 20, which is best seen in FIGS. 5 and 6, has a first (receiving) end 21 that is longitudinally spaced from a second (securing) end 23. While any of an assortment of sizes, orientations, and geometries are envisioned, the receiving end 21 has a polygonal shape with a wider lateral dimension (e.g., left-to-right width in FIG. 5) than the securing end 23, which has a generally rectangular shape.

One or more ramped tabs—e.g., first and second triangular ramped tabs 22 and 24, respectively, of FIGS. 5 and 6—are positioned between the first and second longitudinal ends 21, 23 of the elongated chassis aperture 20. The tabs 22, 24 are "ramped" in that a respective sliding surface 25 and 27 of each tab 22, 24 is obliquely angled with respect to an adjoining, neighboring surface of the inner periphery of the aperture 20. As shown, the first and second ramped tabs 22, 24 are laterally spaced from each other, e.g., on the left-hand and right-hand sides of the chassis aperture 20 in FIG. 5, and protrude into the chassis aperture 20. Commensurate with the number of ramped tabs are one or more securing slots—e.g., first and second rectangular securing slots 30 and 32, respectively, of FIGS. 5 and 6—located within or otherwise proximal to the securing end 23 of the chassis aperture 20. In the illustrated example, the first and second securing slots 30, 32 are laterally spaced from each other, e.g., on the left-hand and right-hand sides of the chassis aperture 20 in FIG. 5, each located immediately adjacent a respective one of the ramped tabs 22, 24.

Figure 3:
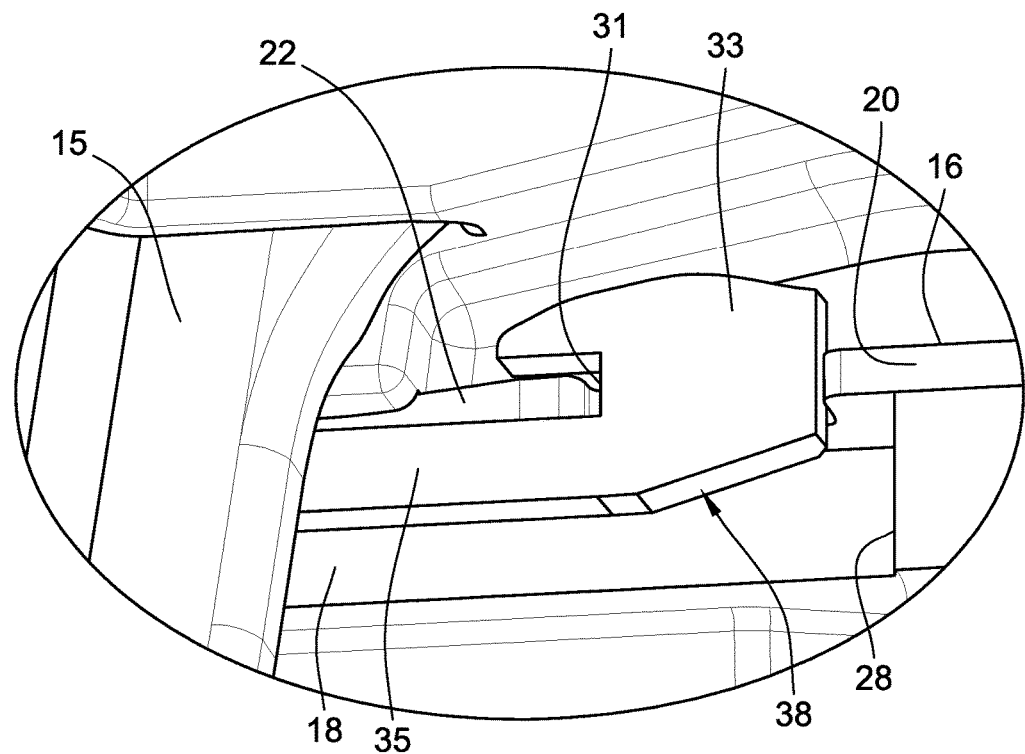
FIG. 3 is an alternative inside perspective-view illustration of the vehicle door assembly of FIG. 1 showing a flexible hook of the handle chassis seated within a securing slot of a door panel.

The handle chassis 18 can be seen in FIG. 3 with a rigid chassis body 34 to which many of the moving components of an exterior door handle mechanism are attached, such as a cable retainer, pulley, bell crank, etc. These components are not necessary to form an understanding of the features of the present disclosure and therefore have not been illustrated in the drawings. Extending through the top surface of the handle chassis 18 is the elongated handle aperture 28, which is configured to receive therethrough a portion of the door handle 14. In particular, FIGS. 2 and 3 illustrate a pivot arm portion 15 of the door handle 14 passing through the door panel's 16 chassis aperture 20, into the handle chassis 18 through the handle aperture 28, and securing to a pivot arm interface 36 of the chassis 18. The door handle 14 pivots about the pivot arm portion 15 to operate the door latch system described above. An optional handle stop (not shown) positioned at an opposite end of the door handle 14 limits the handle's pivoting motion.

Figure 4:
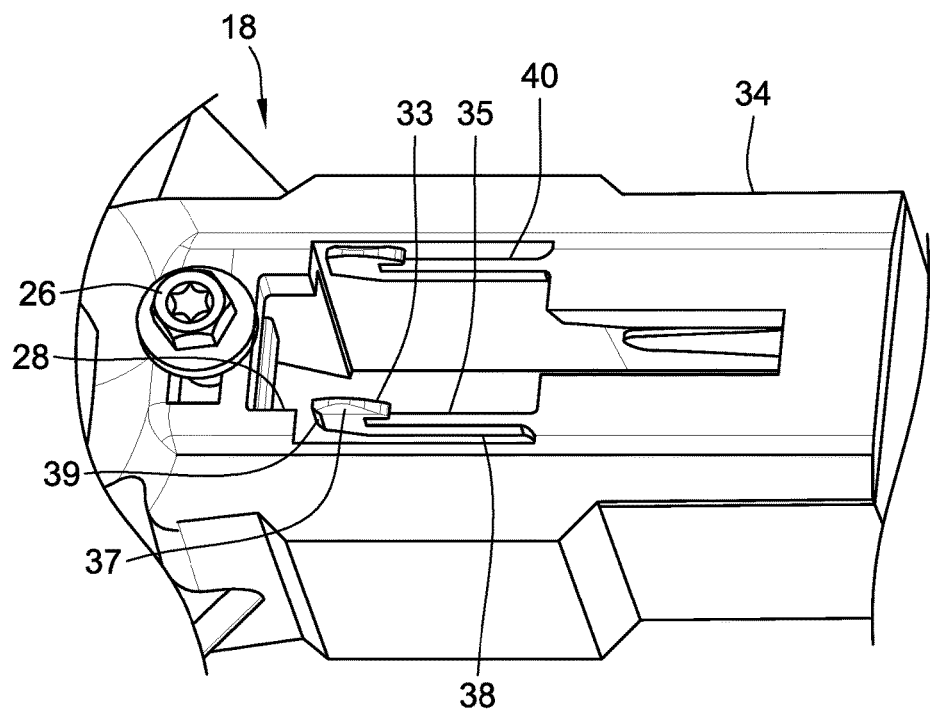
FIG. 4 is a perspective-view illustration of the handle chassis of FIGS. 2 and 3.

A six-way positioning snap lock datum locator is provided to operatively couple the handle chassis 18 to the vehicle's 10 door panel support structure 16. The snap lock datum locator comprises one or more flexible hooks—e.g., first and second cantilevered flexible hooks 38 and 40, respectively, of FIGS. 5 and 6—that project from the chassis body 34, as can be seen in FIG. 4. According to the illustrated example, the pair of flexible hooks 38, 40 are substantially parallel to each other, extending longitudinally along the length of the handle chassis 18. It is desirable, for at least some embodiments, that the flexible hooks 38, 40 project into and are spaced on opposing sides of the handle aperture 28. The rigid chassis body 34 and the flexible hooks 38, 40 can be integrally formed as a single-piece, unitary structure or, alternatively, can be fabricated as separate parts that are subsequently attached together to form the handle chassis 18. The flexible hooks 38, 40 are illustrated as mirror opposites of each other; thus, for purposes of brevity, structural features of both hooks can be described by way of reference to the first hook 38. Each flexible hook 38 includes a curved head 33 that is integrally formed with a shank 35 that connects the curved head 33 to the chassis body 34.

To fasten the chassis body 18 to the door panel 16, the flexible hooks 38, 40 are first inserted into the receiving end 21 of the chassis aperture 20. In order to allow for ease of insertion, the lateral width of the illustrated receiving end 21 is at least as wide (if not wider) than the distance between the outermost lateral surfaces of the flexible hooks 38, 40. This will allow for some additional flexibility, for example, to accommodate manufacturing tolerance variations and minor errors during manual assembly. As another optional structural feature to facilitate insertion of the flexible hooks 38, 40 into the chassis aperture 20, the curved head 33 of each hook 38 can include a ramped lateral surface 37 (FIGS. 4 and 5) that is configured to engage the inner periphery of the chassis aperture 20 and thereby align the flexible hooks 38, 40 and, thus, the handle chassis 18 during insertion.

After insertion of the flexible hooks 38, 40 into the chassis aperture 20, the handle chassis 18 then translates rectilinearly, e.g., from bottom to top in FIG. 5, to move the hooks 38, 40 from the receiving end 21 towards the securing end 23 of the door panel's 16 chassis aperture 20. While moving in this direction, the flexible hooks 38, 40 will be forced to slide against and pass over the ramped tabs 22, 24. In so doing, the ramped tabs 22, 24 urge the flexible hooks 38, 40 in a first direction, e.g., towards each other. To facilitate the mating of the flexible hooks 38, 40 with the ramped tabs 22, 24, the curved head 33 can be provided with a ramped leading surface 39 (FIGS. 4 and 6) configured to engage the sliding surface 25 of the ramped tab 22 and thereby align the handle chassis 18 while moving towards the securing end 23. Once the flexible hooks 38, 40 clear the ramped tabs 22, 24, the moment force applied by the tabs 22, 24 will be removed allowing the hooks 38, 40 to elastically flex in a second direction, e.g., away from each other, and move into the securing slots 30, 32, as seen in FIG. 6. Once properly seated within the securing slots 30, 32, the flexible hooks 38, 40 operate to securely mechanically couple the chassis body 34 to the door panel 16. An optional threaded fastener 26 can then be applied to rigidly lock the vehicle handle chassis 18 to the door panel 16.

The snap lock design provides for multi-axis datum positioning and secure mechanical engagement of the handle chassis 18 during construction of the vehicle door assembly 12. By way of non-limiting example, the leading and trailing sides of the curved head 33 are configured to engage with (e.g., press against) first and second opposing shoulders 41 and 43, respectively, of the securing slot 30 to thereby prevent substantial rotational motion about the lateral axis (pitch) and substantial longitudinal (fore-and-aft) translation motion of the handle chassis 18. Moreover, a side surface of each curved head 33 is configured to engage with the inner periphery 45 of the securing slot 30 to thereby prevent substantial rotational motion about the perpendicular axes (yaw) and substantial lateral (port-and-starboard) translation of the handle chassis 18. A throat 31 of the curved 33 head is configured to engage with the shoulder 41 of the securing slot 30 to thereby prevent substantial rotational motion about the longitudinal axis (roll) and substantial normal (vertical) translation of the handle chassis 18. In other words, the snap lock design may allow for some minor play between the flexible hooks 38, 40 and the securing slots 30, 32, but would otherwise prevent additional translation and rotation of the handle chassis 18 that might otherwise cause the handle chassis to become dislodged from the door panel 16.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and aspects.

What is claimed:

1. A handle chassis for a door assembly of a motor vehicle, the door assembly including a door handle and a support structure with a chassis aperture and first and second ramped tabs, the chassis aperture having receiving and securing ends with first and second securing slots proximal the securing end, the handle chassis comprising:
   a rigid chassis body with a handle aperture configured to receive therein a portion of the door handle such that the door handle secures to the chassis body; and
   first and second flexible hooks projecting from the chassis body, the first and second flexible hooks being configured to insert into the receiving end of the chassis aperture, flex in respective first directions while moving over the first and second ramped tabs, respectively, towards the securing end, and thereafter flex in respective second directions into the first and second securing slots, respectively, to thereby couple the chassis body to the support structure of the door assembly.

2. The handle chassis of claim 1, wherein the first and second flexible hooks are configured to flex towards each other while moving over the first and second ramped tabs, respectively, and thereafter flex away from each other into the first and second securing slots, respectively.

3. The handle chassis of claim 1, wherein the first and second flexible hooks are substantially parallel to each other.

4. The handle chassis of claim 1, wherein the first and second flexible hooks project into and are spaced on opposing sides of the handle aperture.

5. The handle chassis of claim 1, wherein each of the first and second flexible hooks includes a curved head integrally formed with a shank, the shank connecting the curved head to the chassis body.

6. The handle chassis of claim 5, wherein the curved head includes a ramped lateral surface configured to engage the inner periphery of the chassis aperture and thereby align the handle chassis during insertion of the first and second flexible hooks into the receiving end of the chassis aperture.

7. The handle chassis of claim 5, wherein the curved head includes a ramped leading surface configured to engage a sliding surface of the ramped tab and thereby align the handle chassis while moving from the receiving end towards the securing end of the chassis aperture.

8. The handle chassis of claim 5, wherein leading and trailing sides of the curved head are configured to engage with first and second opposing shoulders, respectively, of the securing slot to thereby prevent substantial pitch and substantial longitudinal translation of the handle chassis with respect to the support structure of the door assembly.

9. The handle chassis of claim 5, wherein a side surface of the curved head is configured to engage with the inner periphery of the securing slot to thereby prevent substantial yaw and substantial lateral translation of the handle chassis with respect to the support structure of the door assembly.

10. The handle chassis of claim 5, wherein a throat of the curved head is configured to engage with a shoulder of the securing slot to thereby prevent substantial roll and substantial normal translation of the handle chassis with respect to the support structure of the door assembly.

11. The handle chassis of claim 1, wherein the rigid chassis body and the first and second flexible hooks are integrally formed as a single-piece, unitary structure.

12. A motor vehicle, comprising:
    a vehicle body having a door frame; and
    a door assembly including:
       a door handle with a pivot portion;
       a door panel mounted to the door frame, the door panel including an elongated chassis aperture and first and second laterally spaced ramped tabs protruding into the chassis aperture, the chassis aperture having longitudinally spaced receiving and securing ends with first and second laterally spaced securing slots located adjacent the first and second ramped tabs, respectively; and
       a handle chassis comprising a rigid chassis body with a handle aperture, the pivot portion of the door handle passing through the chassis aperture in the door panel, into the handle chassis through the handle aperture, and securing to a pivot arm interface, the handle chassis including first and second substantially parallel flexible hooks projecting into the handle aperture,
    wherein the first and second flexible hooks are configured to insert into the receiving end of the chassis aperture, translate towards the securing end, flex towards each other while sliding against the first and second ramped tabs, respectively, and thereafter flex away from each other into the first and second securing slots at the securing end of the chassis aperture, respectively, to thereby couple the chassis body to the door panel.

13. A method of constructing a handle chassis for a door assembly of a motor vehicle, the door assembly including a door handle and a support structure with a chassis aperture and first and second ramped tabs, the chassis aperture having receiving and securing ends with first and second securing slots proximal the securing end, the method comprising:
    forming a rigid chassis body with a handle aperture configured to receive therein a portion of the door handle such that the door handle secures to the chassis body; and
    forming first and second flexible hooks to project from the chassis body, the first and second flexible hooks being configured to insert into the receiving end of the chassis aperture, flex in respective first directions while moving over the first and second ramped tabs, respectively, towards the securing end, and thereafter flex in respective second directions into the first and second securing slots, respectively, to thereby couple the chassis body to the support structure of the door assembly.

14. The method of claim 13, wherein the first and second flexible hooks are configured to flex towards each other while moving over the first and second ramped tabs, respectively, and thereafter flex away from each other into the first and second securing slots, respectively.

15. The method of claim 13, wherein the first and second flexible hooks are substantially parallel to each other, and wherein the first and second flexible hooks project into and are spaced on opposing sides of the handle aperture.

16. The method of claim 13, wherein each of the first and second flexible hooks is integrally formed with a curved head and a shank, the shank connecting the curved head to the chassis body.

17. The method of claim 16, wherein the curved head is formed with a ramped lateral surface configured to engage the inner periphery of the chassis aperture and thereby align the handle chassis during insertion of the first and second flexible hooks into the receiving end of the chassis aperture.

18. The method of claim 16, wherein the curved head is formed with a ramped leading surface configured to engage the inner periphery of the ramped tab and thereby align the handle chassis while moving from the receiving end towards the securing end of the chassis aperture.

19. The method of claim 16, wherein leading and trailing sides of the curved head are configured to engage with first and second opposing shoulders, respectively, of the securing slot to thereby prevent substantial pitch and substantial longitudinal translation of the handle chassis with respect to the support structure of the door assembly.

20. The method of claim 13, wherein the rigid chassis body and the flexible hook are integrally formed as a single-piece, unitary structure.

\* \* \* \* \*